United States Patent [19]

Segredo et al.

[11] Patent Number: 5,386,766
[45] Date of Patent: Feb. 7, 1995

[54] AUTOMATIC JUICE EXTRACTION SYSTEM

[75] Inventors: Guillermo T. Segredo; Michael L. Suter, both of Lakeland, Fla.

[73] Assignee: FMC Corporation, Chicago, Ill.

[21] Appl. No.: 49,892

[22] Filed: Apr. 20, 1993

[51] Int. Cl.6 .......................................... G01N 33/14
[52] U.S. Cl. ..................................... 99/495; 426/231; 100/45
[58] Field of Search ................. 99/495, 489, 484, 485, 99/486; 426/231, 489, 616, 599, 330.5; 100/45, 213

[56] References Cited

U.S. PATENT DOCUMENTS

| | | | |
|---|---|---|---|
| 2,309,328 | 1/1943 | Polk, Sr. et al. | 426/489 |
| 4,109,314 | 8/1978 | Meyer et al. | 364/552 |
| 4,154,163 | 5/1979 | Niemann | 99/495 X |
| 4,335,145 | 6/1982 | Stanley | 99/495 |
| 4,391,185 | 7/1983 | Stanley | 99/495 |
| 4,643,088 | 2/1987 | Kollmar | 99/495 |
| 5,097,757 | 3/1992 | Cimenti | 99/495 |

*Primary Examiner*—David A. Scherbel
*Assistant Examiner*—Patrick F. Brinson
*Attorney, Agent, or Firm*—Douglas W. Rudy

[57] ABSTRACT

A juice extraction process control system includes provisions to determine the load on the processing line and adjust processor speed and availability of juice extraction hardware responsive to the through put load of the juice extraction process facility.

9 Claims, 5 Drawing Sheets

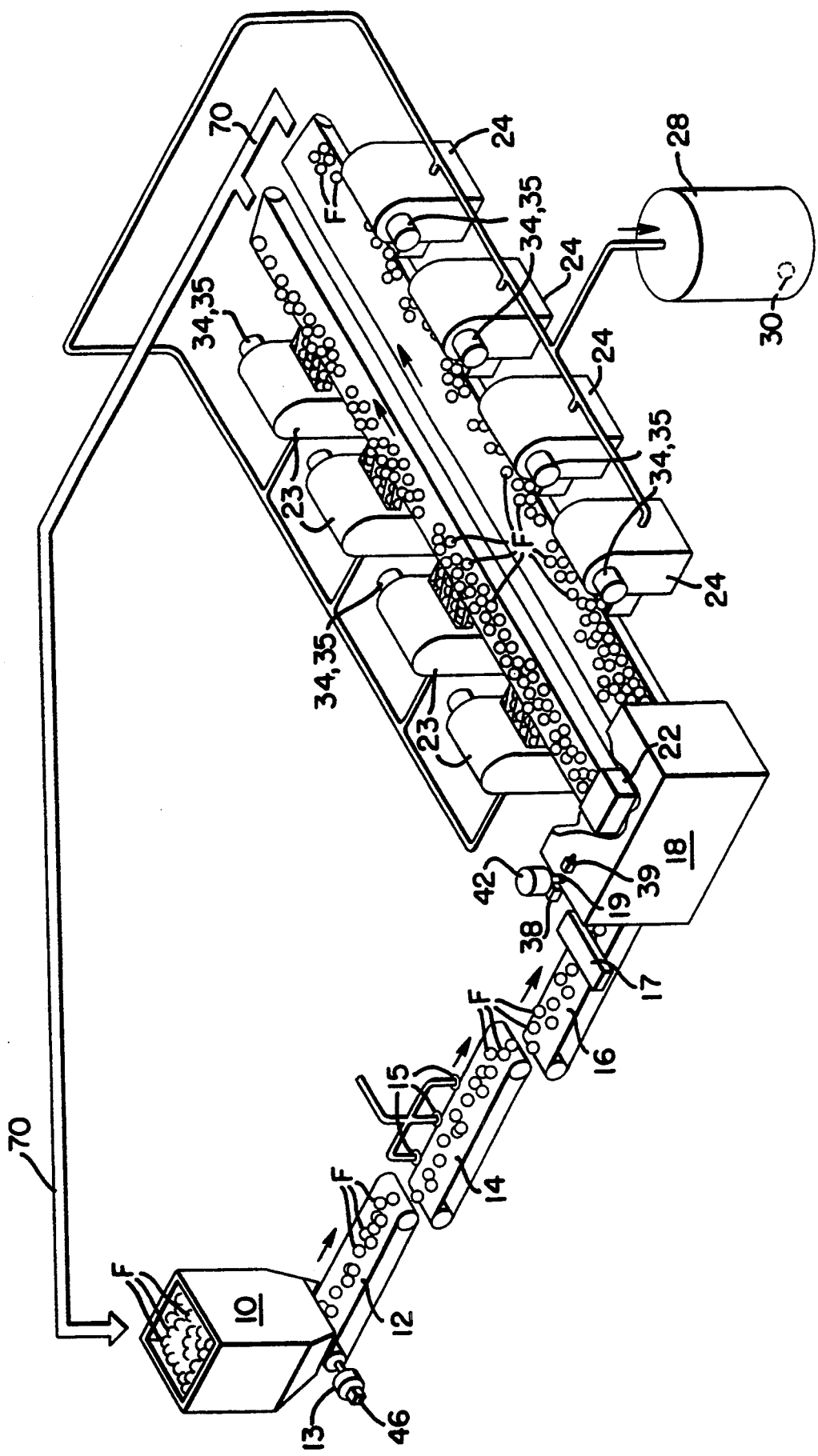

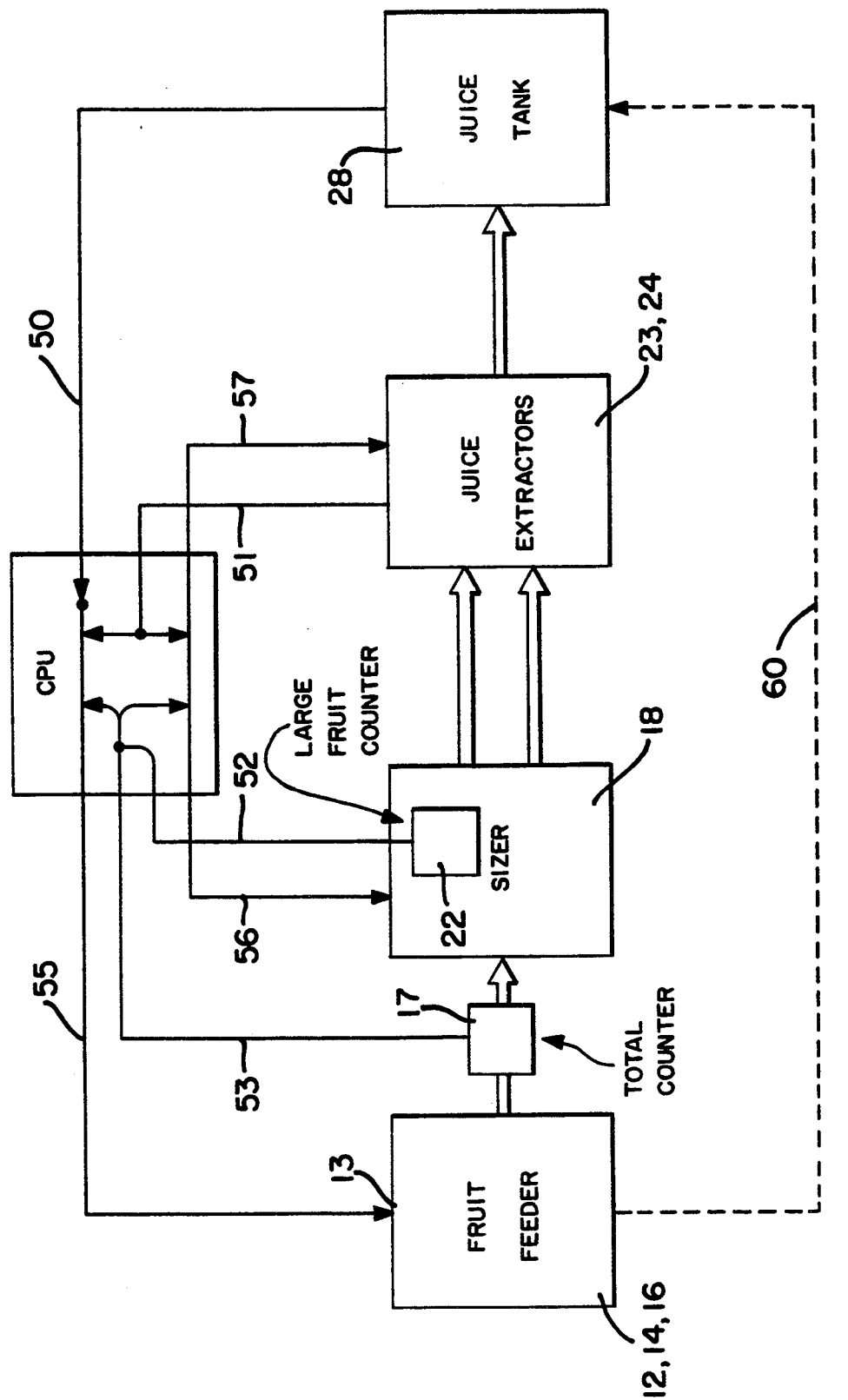
FIG_2

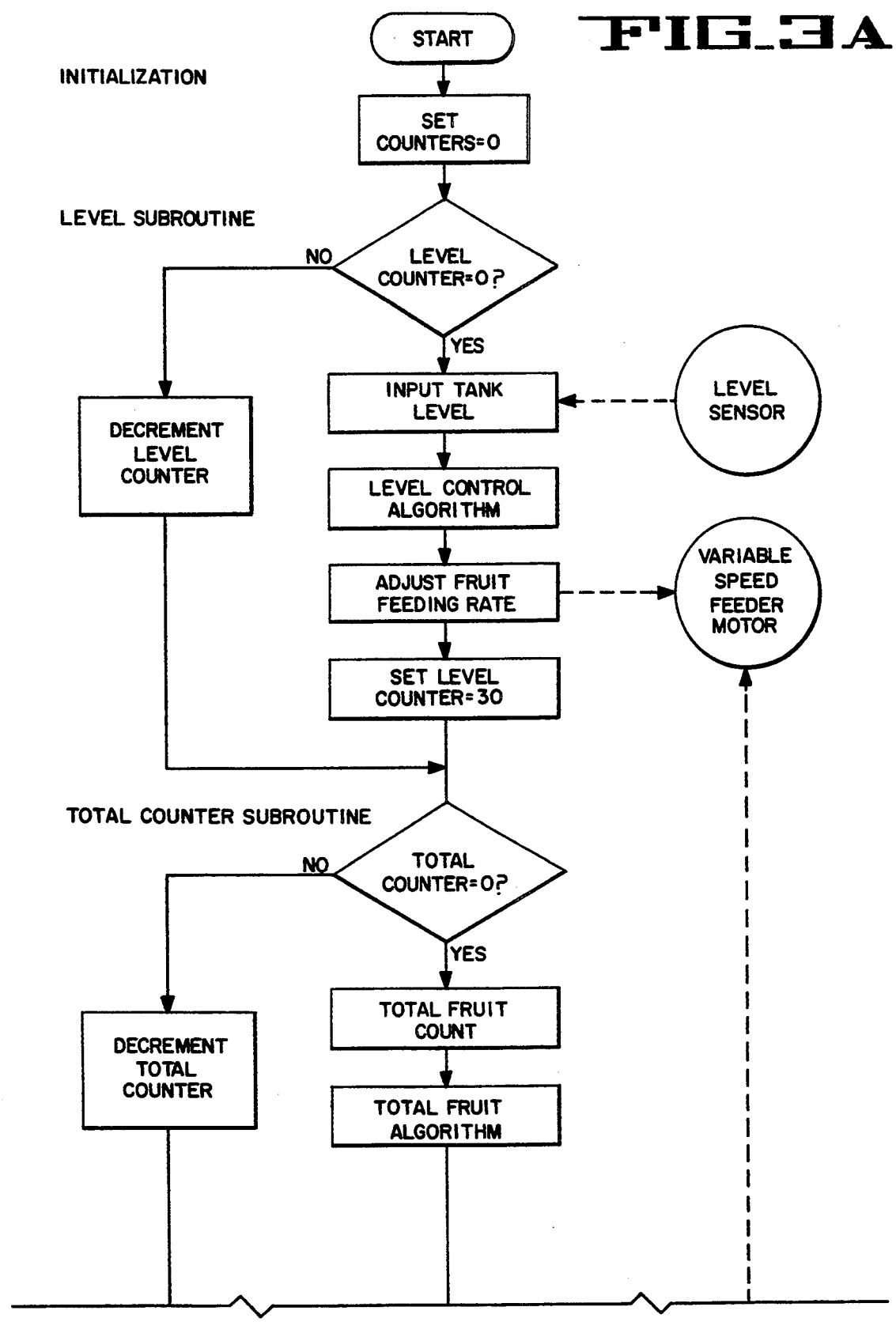

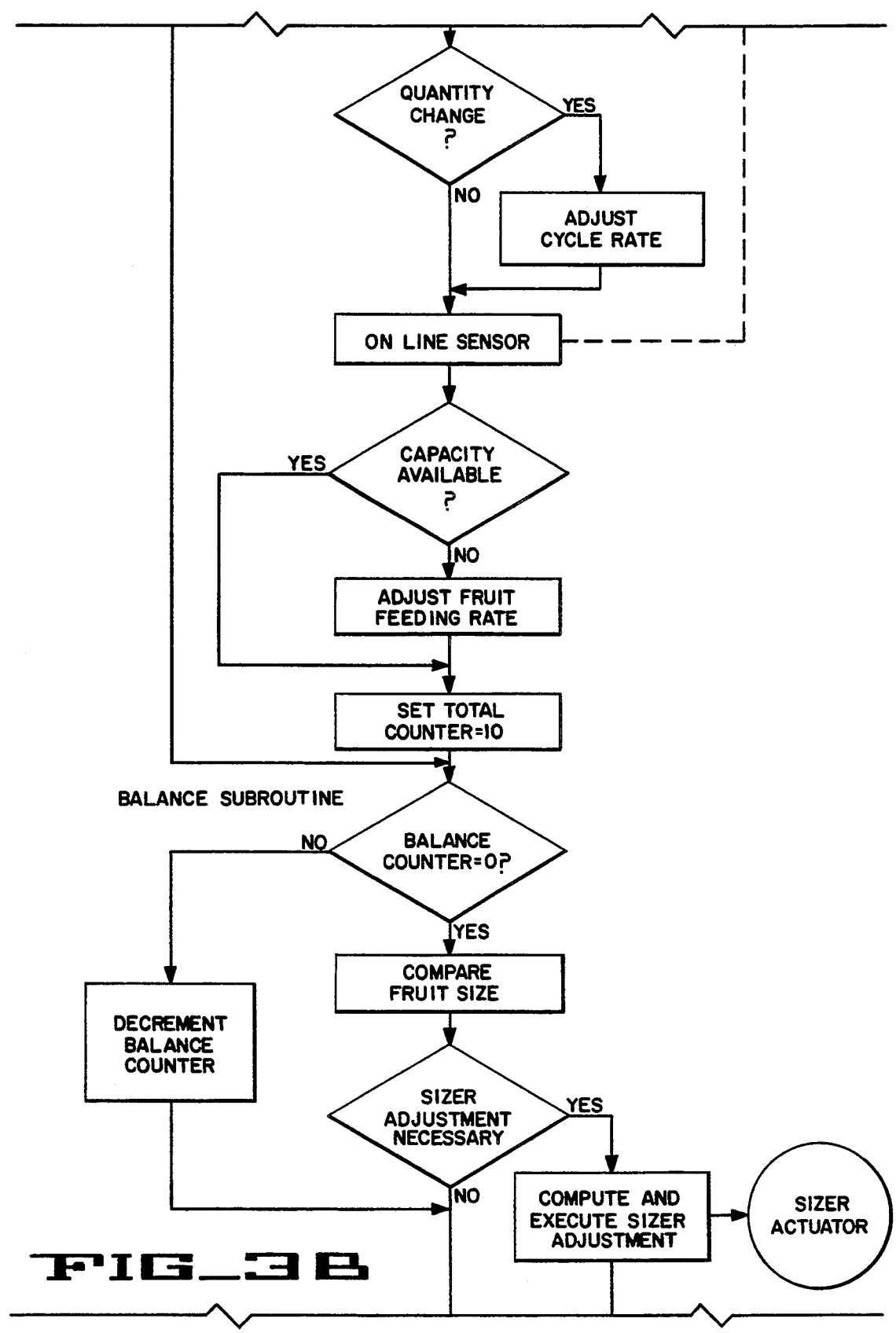

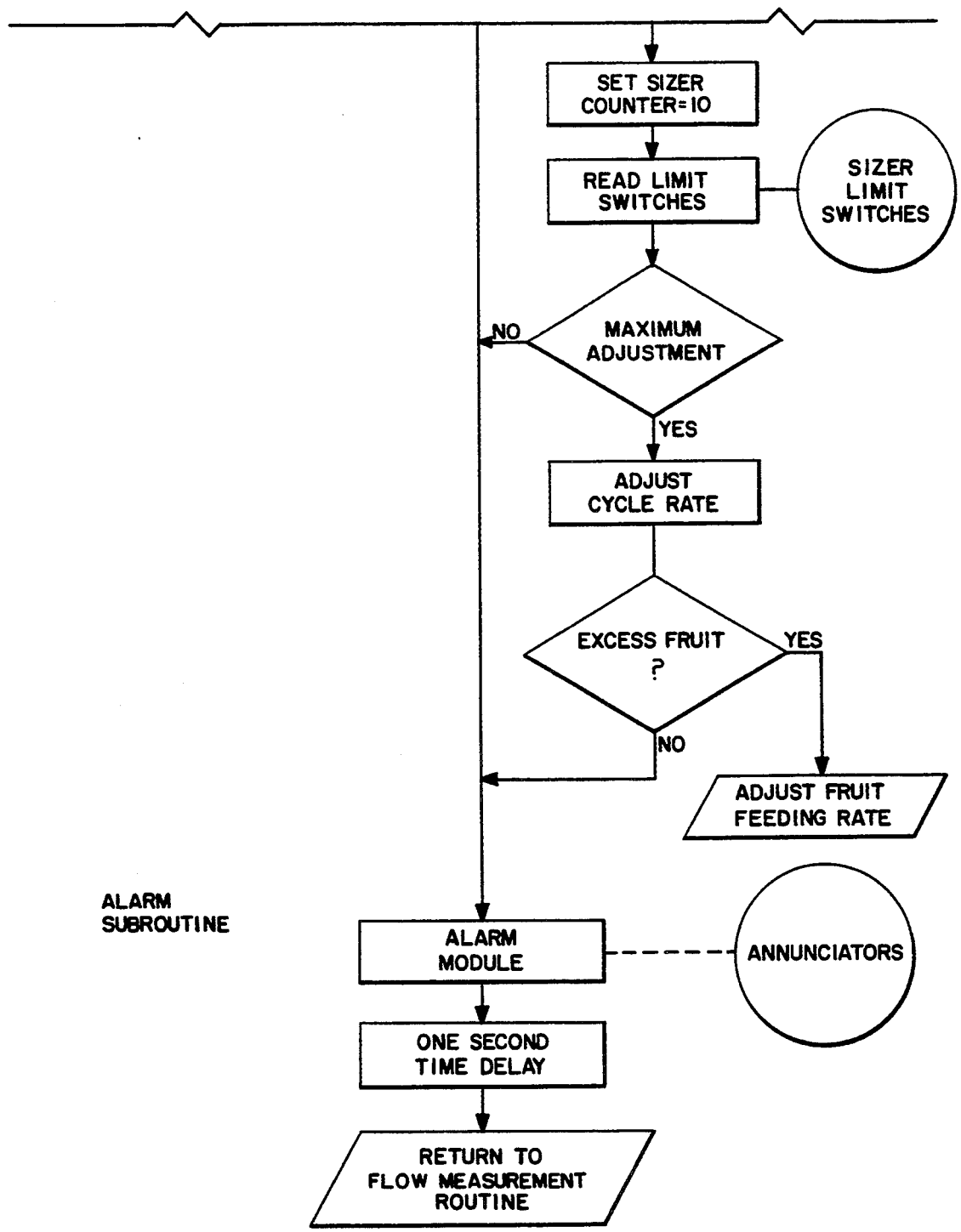
FIG_3C

AUTOMATIC JUICE EXTRACTION SYSTEM

This invention has to do with the automation of juice producing plants, specifically the automation of juice extractor lines in "juice rooms" of juice plants that include numerous juice extraction machines for the extraction of juice from citrus fruit such as oranges. The invention includes a method for changing the cycle rate of the juice extraction machines while product is being processed through the juice plant.

The operation of a juice extraction plant is well known in the art. A good description of the operation of a citrus juice plant is given in U.S. Pat. No. 4,335,145 which is assigned to the same company to which this invention is assigned. That patent explains a method of controlling the flow of product through a juice extraction facility with the key being the control of the extractor machines by shutting them down and subsequently starting them up again as juice volume in a juice storage tank increases or decreases depending on the flow of juice through the system.

During normal operation of a juice room the fruit delivery system is intended to supply all the extractors with sufficient fruit to maximize both yield and production. Because juice yield is directly affected by fruit size and extractor components, it is critical that the proper size fruit be processed by the components installed in the extractor, such as the juicing cups, designed to handle the size of fruit being fed to the system. Should the fruit supply be insufficient, either in quantity or in the size of fruit in the system, to feed all the extractors, the extractors without fruit will be deprived of fruit and would cycle without fruit. This situation can cause excessive wear on the extractor components. Also, extractor cycling without fruit will, of course, be detrimental to juice plant production efficiency and will continue unless actions are taken to correct the problem.

Some operating plants incorporate a form of fruit sizer and fruit feed control. These state of the art juice plants incorporate a return fruit system wherein fruit is recycled to the feed bin in the even that fruit is not processed by an extractor on a particular pass through the extraction line. The return fruit count that is used to determine the condition of the fine capacity provides process control information that lags the process significantly and thus does not provide the most timely information necessary to assure the highest operating effectiveness of the juice plant.

This invention provides a method for monitoring and controlling a typical juice extracting operation. The process is intended to monitor the fruit feed into the extraction process and adjust both the fruit feed supply and the extraction equipment speed, basically extractor cycles per minute, for maximum processing efficiency, while reducing the potential of running extraction equipment without fruit.

FIG. 1 is a schematic representation of the flow of fruit and fruit juice through a juice extraction facility.

FIG. 2 is a schematic representation showing the relationship of the control loops of the automatic juice room system.

FIGS. 3A, 3B and 3C comprise a flow chart that illustrates the programming of the CPU or PLC used to control the automatic juice room.

The automatic juice extraction plant control system presented herein comprises a programmable logic controller or a real time computer (hereinafter referred to as the "CPU") capable of receiving data from remote locations and transmitting control signals to remote actuators, to the extractor drive motor controllers, and to the fruit feeder belt. The CPU receives input signals from the juice storage level sending unit, two input counters, feedback information from the variable speed drives on the fruit feed belt and each of the juice extractor drive motors. The CPU then calculates the necessary process changes that need to made to the reactive components of the system calculated according to a predetermined computer program. The CPU includes the necessary power supply, computational capacity in its central processing unit, and input and output circuitry required to control and operate the system presented herein.

Looking first at FIG. 1 there is seen a prototypical citrus juice extraction plant in some what of a schematic presentation. Fruit, such as oranges identified as F, are loaded into the bulk storage or surge bin 10. The bin will be unloaded through the bottom onto a feed conveyor 12 that is driven by a variable speed motor 13 that will be, as necessary, controlled by the motor speed controller 46 in response to signals from the CPU (not shown in this view but mounted proximate the extraction fine). The motor speed controller may also provide feedback information to the CPU. The surge bin and its attendant feed conveyor is designed to meter fruit to the extractor lines in such a manner as to keep the extraction process supplied with an ample amount of fruit. The feed belt will deposit the fruit onto a washing conveyor 14 where the fruit will be washed by water spray nozzles such as 15. The fruit F will then be transported by means of a roller conveyor 16 to a sizer 18.

The sizer 18 is a conventional sizer of the type that divides the fruit into two or more size categories-usually based on a predetermined optimal size of the fruit. The sizer can be adjusted to select or deselect non-optimal size fruit depending on the production needs of the extraction line. Such technique are well known in the sizer industry. A "belt and roller" sizer as disclosed in the above identified patent would be an appropriate sizer if modified as follows. As shown in the sizer 18 of FIG. 1, a fruit sensor, specifically, a large fruit sensor is installed inside the sizer. The large fruit sensor, available from Sci-Agra as Census Model #4, comprises multiple sensors each being one 4 inch long army per each sizer line. A box, item 22, in the broken away portion of the sizer 18, pictorially represents an army of perhaps eight fruit sensors that are associated, one per sizer line with the lines in the sizer.

Immediately prior to the sizer 18, over the sorting conveyor 16, there is another fruit sensor 17. This fruit sensor 17 consists of two thirty inch arrays mounted directly above the discharge of the grading station, which is designed as a roller conveyor. The counter referred to herein is available from Sci-Agra and is believed to be Census Model #30. Fruit on the sorting conveyor 16 will pass below the sensor 17 and will be counted by the CPU as will be explained further on.

The sizer 18 is equipped with a sizer adjustment means 19 including a drive motor 42 for effecting the selection of oranges directed to the appropriate juice extractor line. Oranges are typically classified by size and oranges of a particular size are directed to the juice extractor line that has been fitted with extractor components that are best suited to extract juice from that size orange. A pair of limit switches, 38 and 39, are provided to limit the degree of adjustment of the sizer adjustment means.

In the embodiment shown in FIG. 1, the fruit is divided into two lines with each line serving a plurality of independently driven fruit juice extractors such as 23 and 24. It will be appreciated that the number of fruit on the conveyor lines will be consumed by the extractors as the fruit is transported down the conveyor lines. Ideally it would be most productive if all the fruit on the lines is consumed by the extractors however provision is made for recycling fruit that hasn't been consumed. The overflow fruit is returned to the bulk storage bin by means of the recycle conveyor 70.

FIG. 2 schematically presents the control loops and the feedback from the process load found in a juice extraction facility controlled by the present invention. Solid lines represent information gathered by the CPU and control actions initiated by the CPU.

The control system includes input line 50 from the juice tank level sensor 30. Juice extractor status line 51 sends a signal to the CPU indication when a particular juice extractor is shut down and thus not processing any fruit. Large fruit count line 52 connects the large fruit counter 22 with the CPU while the total fruit count fine 53 provides a conduit for sending the count from the total counter 17 to the CPU.

Line 55 is the signal fine from the CPU to the motor speed control of the variable speed feed motor 13.

Line 56 transfers the output signal from the CPU to the sizer 18 to allow and cause changes in the sizer selectivity. The output fine to the juice extractor, line 57, allows the CPU means to communicate with the juice extractors and will transport signals to slow down or speed up the extractor cycle rate depending on load on the system.

The broken fine 60 represents a natural feedback path which occurs when a change is made in the juice extractor cycle rate when a change is made in the fruit feeding rate.

Multiple control loops are routed through the CPU as shown in FIG. 2. For instance a first control loop relies on the juice level signal from the storage tank 28. As the level in the storage tank decreases two options, which may be undertaken together, are possible. A first option is to increase the speed of the feed conveyor 12 by sending a signal from the CPU to the motor speed control 46. This will allow more fruit to be let out of the storage bin 10 and sent to the sizer 18. The second option is to increase the cycle speed of the juice extractors by sending a signal via line 57 to the motor controller centers 34 of the variable speed DC motors used on each of the juice extractors.

It has been found that each juice extractor can be equipped with a motor controller such as a DanFoss drive controller of the "VLT Series" available from the DanFoss Company. The drive controller will adjust the speed of the juice extractor drive motor, previously capable of being either "on", which would therefore drive the juice extractor at a predetermined cycle speed or "off" as is taught in the above mentioned patent, to run at either an increased or decreased cycle speed. The cycle speed can be adjusted upwardly or downwardly depending on the CPU output to the drive motor controller. Groups of extractors can be controlled together such that all the extractors in a group handling a given fruit size are adjusted together.

A significant control loop entails using the information from the total counter 17, which is a raw score counter which registers (in the memory of the CPU) a total number of fruit passing under the total counter 17 during a period of time. The sizer also includes a counter system, usually one counter for each line of sized fruit coming out of the sizer, this being the large fruit counter 22. The count from the large fruit counter is sent to the CPU which subtracts the number of large fruit from the number of total fruit, and the result being the number of small fruit which will pass to the extractors.

The normal mix of juice oranges is roughly 70% small fruit. Therefore when extraction equipment is installed for a particular run of fruit it would not be unusual to have 70% of the machines set up for the small fruit. This is not a rule but is more along the line of an explanation. In any event if 70% of the fruit is expected to be small the sizer will be setup to direct the small oranges to the 70% of machines with small fruit juicing equipment. During a particular run a variation of fruit size will naturally be loaded into the bin. The fruit size ratio may be outside the expected 70% small, either higher or lower, thus the sizer will be automatically adjusted to widen the parameters of small or large fruit. By doing this, assuming that there are more small fruit in the fruit stream, small fruit will be diverted to machines set up to handle large fruit as long as the fruit can be handled by the extractors. All this is controlled by the CPU directing the sizer to adjust its selectivity as a result of subtracting the number of large fruit sensed by the large fruit counter from the number of fruit sensed by the total counter.

In the event that the volume of fruit is less than the volume that can be processed by the extractors the extractors can be adjusted by means of the drive motor controllers 34, 35 being slowed as the result of a signal from the CPU. Thus a machine that would be expected to cycle 100 cpm (cycles per minute) could be slowed to only the cycles per minute necessary to process the fruit coming into the system. For instance if the fruit infeed dropped to seventy percent of the expected volume the extractors could also be reduced to seventy percent of the predetermined optimum speed.

The reduction in fruit would be sensed by the total counter and the machines could be slowed down or sped up in proportion to the total counter, however in a preferred embodiment it would be more usual to slow down or speed up the machines handling the larger fruit while the bulk of machines for handling small fruit would cycle at close to maximum preset cycle rates. A whole matrix of machine cycle speeds relative to fruit size, juice quality, extractor availability, etc. is possible as the CPU has processing capacity to direct the machines to operate in a manner that maximizes the juice extraction process.

The method presented attempts to insure that all extractors in a juice room are continuously processing juice.

FIGS. 3A, 3B and 3C attempt to show the process flow logic which has been programmed in to the CPU which as stated above could be a PLC such as an Allen-Bradley PLC 5/60 or a combination of an Allen-Bradley PLC 5/11 with a PLC 5/60. The CPU is adopted to operate in real time and the sequence of programming steps indicated in FIGS. 3A, 3B and 3C are initiated once per second for a rapid modification of machine cycle speeds.

The program comprises an initialization subroutine each time the control system is started and is thereafter bypassed by the programming.

The level subroutine receives data from the level sensor located in the juice storage tank and when necessary provides the appropriate control action to maintain the level of juice in the juice tank at a preselected value.

A total counter subroutine updates periodically. The update time is shown as every forty-five cycles but it could be updated every cycle, every ten cycles or any other number of cycles which is deemed to be "frequent enough" to give a good result but not too frequently to overburden the system with unnecessary information.

The total counter subroutine will take the total count and will do one of several operations. One output path available to the CPU is to take the total count, compare it to a preset target number and if there is a difference either speed up or slow down the feed belt by adjusting the variable speed feeder motor.

A second path which will normally be followed in conjunction with the first path set out above will entail following the balance subroutine set forth below.

The balance subroutine relies on input to the CPU from the total counter 17 and the large fruit counter 220 In this operation the CPU will send signals to the motor controllers of the juice extractors such that the cycle rate of the extractors, as a function of extractor speed, will be adjusted as to ensure that all of the extractors are being properly fed.

An alarm subroutine actuates warning fights on an annunciator panel in the control room when an alarm condition exists. After all subroutines are executed, the program undergoes a one second time delay and then returns to the level subroutine.

The level subroutine starts with the examination of the level counter. If it is greater than zero the counter is decremented by one and the subroutine is bypassed. When the level counter is equal to zero the level sensor is read and the value is input into CPU memory. The level sensor 30 may be of any type capable of transmitting a signal capable of being input into the CPU. For example, the sensor may be a pressure transducer with a 0–5 v. output.

The analog signal is converted to digital by a conventional A/D converter.

The program will next execute the total counter subroutine. If the total counter is zero the total counter 17 is read and the value is input into memory. The total fruit count will be compared to a preset total fruit count in the algorithm. If there is a difference between the sensed total fruit count and the preset total fruit count the CPU will d'tract the extractor motor controllers to slow down or speed up to provide the capacity to process the quantity of fruit passing through the system. If the total fruit count is within a range of values bracketing the preset total fruit count no change will be made to the extractor speed. The bracket values can be increased or decreased as necessary.

If no change in extractor speed is needed the program will continue to determine how many juice extractors are available. Each machine sends its online status (line 51 in FIG. 2) to the CPU which stores the on-off status in memory. The on-line algorithm determines how many extractors are available. If a sufficient number of machines are not available to handle the fruit from the fruit feed conveyor the speed of the feed conveyor 12 will be decreased to provide a stream of fruit that can be handled by the on-fine extractors. This decrease in speed will be held until extractors come on-fine and the hold step, corresponding to the maximum feed speed for the number of machines on fine, will increase until all extractors are on line. In the event that an extractor comes on line giving the line full capacity then the hold on the fruit feed conveyor speed will be released and the fruit feed conveyor speed will return to its preset default desired speed. Speed increases of the feed conveyor can be stepped to correspond to incremental increases in extractors coming on line.

The total counter is set to 10 however this is an arbitrary number. It has been selected as it will allow-rapid increases in speed adjustments if necessary—a change could be made as frequently as every ten seconds.

The program next enters the balance subroutine. The balance counter, which determines the number of small fruit from subtracting the number of large fruit sensed in the sizer by the large fruit counter 22 from the total number of fruit sensed by the total counter 17 prior to the sizer, includes an algorithm that determines the extractor speeds necessary for various extractors in order to minimize the number of fruit being recycled back to the storage bin 10.

When the balance counter is zero the program will compare the number of small fruit coming out of the sizer with a preset target value. If it is determined that less small fruit are coming out of the sizer, relative to the total number of fruit, thus underutilizing the extractors set up for small fruit then the sizer adjustment will be made. Sizer 18 adjustment is achieved by driving the sizer adjustment motor 42 in the appropriate direction for a predetermined period of time. A solid state relay which is connected to a reversing motor starter on the sizer adjustment motor 42, is activated by the CPU for the predetermined amount of time in order to drive the sizer motor in the proper direction.

The program will examine the limit switches 38 and 39 on the sizer motor 42 to determine if the maximum sizer adjustment has been reached. If the maximum sizer adjustment has been reached then the CPU will send a signal to the variable speed motor controllers of the extractors to adjust the speed of the extractors. For instance if the sizer has been adjusted to maximize the number of fruit classified as small fruit, even if the fruit is larger than the preferred small fruit, and the feed belt is supplying fruit at the speed corresponding to small fruit extractor capacity it is possible that the number of large fruit is less than the extraction capacity available on the extractors set up for large fruit. Thus these machines, the large fruit extractors, will be slowed such that they can process all the large fruit being supplied to them with extractors running out of fruit. On the other hand if the sizer has been adjusted (to the maximum) to allow smallish fruit to be classified as large fruit so that a maximum amount of fruit can be extracted by a system biased to small fruit then the speed of the large fruit extractors—if was set lower than the maximum cycle speed—will be increased.

Furthermore if an unusual mix of more large fruit than small fruit is fed to the system, assuming that the normal preset setup is much more small fruit than large fruit fed to the sizer and the sizer adjustment has been maximized, then it may be advantageous to run the large fruit extractors at maximum capacity, maximize the number of fruit going to the small extractors by adjusting the sizer to allow larger oranges to be classified as small oranges, and then of the small extractors are "running dry" decrease the speed of the small extractors.

Once the program has adjusted the sizer to a maximum setting and has subsequently adjusted the cycle rate the program will determine by comparing the total fruit count to the capacity of the on-line extractors whether or not there is excess fruit that cannot be processed by the extractors. The program will output a signal to the juice room operator who will then have the option of running the juice room at maximum volume or running the juice room at a level of quality that would require less than maximum volume through the juice room. Maximum quality would require the sizer to limit fruit size so that small fruit would not be processed on extractors equipped to handle large fruit and vice versa. Maximum production would result by running all of the extractors at maximum cycle speed and feeding them with fruit indiscriminately without regard to fruit size (within reasonable parameters).

The final subroutine of the program is the alarm subroutine which examines the process variables to monitor whether or not they are in an acceptable range. Should a variable lie outside the accepted range an alarm is raised on an annunciator panel and the juice room operator can override the automatic control system. after a one second delay the program returns to the level subroutine and the cycle just described is begun again.

Although the best mode contemplated for carrying out the present invention has been herein shown and described, it will be apparent that modification and variation may be made without departing from what is regarded to be the subject matter of the invention.

What is claimed is:

1. A method of controlling extractor cycle optimization of juice extractors in a juice extraction system comprising the steps of:
    determining the total quantity of fruit coming into the system,
    determining the number of fruit of a first given size coming into the system,
    adjusting the cycle speed of an extractor, said extractor provided with a variable speed drive allowing the extractor to be driven between a maximum cycle speed and a cycle speed more than fifty percent less than the maximum speed, when the number of fruit of a first given size is proportionately different from an optimized proportion of fruit of a first given size to the total fruit coming into the system.

2. The invention in accordance with claim 1 wherein the determination of the total quantity of fruit coming into the system is determined by means of total fruit counter that will count the number of fruit coming into the juice extraction system.

3. The invention in accordance with claim 2 wherein the determination of the number of fruit of a first given size coming into the system is accomplished by sensing the number of fruit of a second given size in the total quantity of fruit coming into the system, and
    subtracting the number of fruit of a second given size from the total quantity of fruit coming into the system to yield the number of fruit of a first given size.

4. The invention in accordance with claim 3 wherein the cycle speed of an extractor is adjusted by decreasing the speed of said extractor when the number of fruit of a first given size is less than the optimized proportion of fruit of a first given size to the total fruit coming into the system.

5. The invention in accordance with claim 4 wherein the cycle speed of an extractor is adjusted by increasing the speed of said extractor when the number of fruit of a first given size is more than the optimized proportion of fruit of a first given size to the total fruit coming into the system.

6. The invention in accordance with claim 5 wherein the cycle speed of an extractor is adjusted by decreasing the speed of said extractor when the number of total fruit coming into the system is less than an optimized total fruit coming into the system.

7. The invention in accordance with claim 6 wherein the cycle speed of an extractor is adjusted by increasing the speed of said extractor when the number of total fruit coming into the system is more that the number of fruit coming into the system set forth in claim 6.

8. The invention in accordance with claim 7 wherein more than one additional extractor is controlled along with the extractor therein, 9. The invention in accordance with claim 8 wherein at least sixty percent of the extractors are capable of extracting juice from fruit of a first given size.

* * * * *